United States Patent [19]
Uhland, Sr.

[11] Patent Number: 5,444,794
[45] Date of Patent: Aug. 22, 1995

[54] CHECK IMAGE CAPTURE SYSTEM

[75] Inventor: Joseph C. Uhland, Sr., Cherry Hill, N.J.

[73] Assignee: SQN, Rancocas, N.J.

[21] Appl. No.: 112,761

[22] Filed: Aug. 25, 1993

[51] Int. Cl.⁶ .............................................. G06K 9/00
[52] U.S. Cl. ..................................... 382/137; 364/401
[58] Field of Search ............... 382/3, 7; 364/401, 408; 235/379, 380

[56] References Cited

U.S. PATENT DOCUMENTS

| | | | |
|---|---|---|---|
| 4,091,448 | 5/1978 | Clausing | 364/200 |
| 4,264,808 | 4/1981 | Owens et al. | 235/379 |
| 4,523,330 | 6/1985 | Cain | 382/7 |
| 4,564,752 | 1/1986 | Lepic et al. | 235/437 |
| 4,580,040 | 4/1986 | Granzow et al. | 235/379 |
| 4,617,457 | 10/1986 | Granzow et al. | 235/379 |
| 4,888,812 | 12/1989 | Dinan et al. | 382/7 |
| 4,974,878 | 12/1990 | Josephson | 283/67 |
| 5,003,189 | 3/1991 | Vala et al. | 250/566 |
| 5,040,227 | 8/1991 | Lyke et al. | 382/7 |
| 5,089,713 | 2/1992 | Vala et al. | 250/566 |
| 5,097,517 | 3/1992 | Holt | 382/7 |
| 5,120,944 | 6/1992 | Kern et al. | 235/379 |
| 5,151,948 | 9/1992 | Lyke et al. | 382/7 |
| 5,170,466 | 12/1992 | Rogan et al. | 395/145 |
| 5,175,682 | 12/1992 | Higashiyama et al. | 364/408 |
| 5,187,750 | 2/1993 | Behera | 382/7 |
| 5,191,525 | 3/1993 | LeBrun et al. | 364/419 |
| 5,204,811 | 4/1993 | Bednar et al. | 364/406 |
| 5,208,869 | 5/1993 | Holt | 382/7 |
| 5,237,158 | 8/1993 | Kern et al. | 235/379 |
| 5,321,238 | 6/1994 | Kamata et al. | 235/379 |

Primary Examiner—Leo H. Boudreau
Assistant Examiner—Christopher Kelley
Attorney, Agent, or Firm—Woodcock Washburn Kurtz Mackiewicz & Norris

[57] ABSTRACT

A check image capture system processes on-us and transit checks to achieve significant cost savings and efficiencies. The check image capture system includes an image pickup device 30, teller personal computer 32, check amount encoder 34, and check amount adder 36. Checks presented to the teller are scanned by the image pickup device 30, which forms image data representing respective images of the checks. Each check is then classified as an on-us check or a transit check. Transit checks are transported to the amount encoder 34 whereas on-us checks are truncated. The check amount adder 36 receives amount data for the transit checks and computes the total of the transit check amounts. The check amount encoder encodes each transit check with the amount associated therewith if the check amount total is correct. The computer is programmed to store the image data and to identify and store account number data, bank number data, and check number data associated with the checks, and to provide the amount data associated with the transit checks to the check amount adder.

6 Claims, 2 Drawing Sheets the amount of the check is written or spelled with alphabetic characters; a line 8 for recording a memorandum to the maker; and a signature line 9 for recording the signature of the maker. In addition, a line of machine-readable MICR code characters is pre-printed on the check in magnetic ink. The MICR code characters include the bank and branch number, on-us characters, and maker's account number. In addition, the MICR characters may include the check number on the same line as the other MICR characters. A blank space is also provided for a later entry of machine-readable MICR characters representing the check amount.

CHECK IMAGE CAPTURE SYSTEM

FIELD OF THE INVENTION

The present invention relates generally to the field of banking and more particularly to a system for efficiently processing checks and other documents (e.g., utility bills) presented to a bank teller.

BACKGROUND OF THE INVENTION

Prior art high-speed check processing systems are reliable but the processing performed by such systems is labor-intensive and requires a rapid, repetitive movement of checks. This processing often causes reading errors, paper jams, and check rejects.

Newer check processing systems employ imaging to capture digital images of the checks. Once these digital images have been captured, a bank may send each of its customers monthly statements with images of the customer's cashed checks instead of the checks themselves. Such image processing allows the checks to be "truncated" prior to shipment to the customer, reducing in-house check processing costs.

The cost of processing checks is high because:

1. Encoding the amount of the check on the bottom of the check in magnetic ink character recognition (MICR) code is expensive. This encoding is performed manually by an operator observing the amount written on the check and encoding this amount in MICR code. Such encoding is required so that batches of checks can be read automatically by a check sorter and balanced. That is, the amount total of all checks fed into the sorter must be known and must remain the same as the checks are sorted by bank number and/or customer account number.

2. Each bank must sort its own checks ("on-us" checks) in account number sequence so that the checks can be returned to the bank's customers in connection with monthly statements provided to the customers. This sorting process requires several iterations and is time-consuming and expensive.

3. Mailing processed checks back to the account holders is expensive.

4. Modifying conventional check sorters by adding the capability to perform image processing can cost a bank from one to several million dollars.

Typically, there are two classes of documents processed by check sorting equipment, including (1) over-the-counter items, and (2) in-clearing items.

Over-the-counter items are items such as checks, deposit slips, and the like, arising from transactions conducted at the processing bank itself or at its branches. These items are "proved," encoded in batches, and then sorted by a sorter. The sorting process typically includes data capture and the sorting of documents by passing the documents through the sorter a variable number of times, depending on different sorting criteria and on the particular sorting algorithm employed by the sorter. Typically, with over-the-counter items, the first pass through the sorter is used to separate "on-us" documents from "transit" documents. The on-us documents are those documents drawn on the processing bank whereas the transit documents are those documents drawn on other banks.

The in-clearing documents are typically all non-on-us documents received from other banks or clearing facilities. Generally, for these documents, the only processing activity required of the sorter is capturing the MICR data and sorting the documents into groups according to individual customer accounts.

FIG. 1 is a block diagram of a prior art check processing system having imaging capability. This system includes equipment (i.e., a balancing station 10 and other components) typically located in the "back room" of the bank, i.e., remote from the teller stations. FIG. 1 also depicts a conventional bank check 1 having the usual areas for: the printed name and address of the maker 2; a date 3; a check number 4, which may be printed with magnetic ink in a machine-readable format; a "pay to the order" line 5; a courtesy amount field 6, wherein the amount of the check is entered by the maker in arabic numerals; an amount line 7 on which As shown in FIG. 1, the balancing station 10 receives checks from branches and/or tellers in the processing bank. The balancing station ensures that the total of the check amounts for a series of checks for a particular depositor account match the total amount indicated in an associated depositor summary document. The checks are then passed to an amount encoder 12 that encodes on each check the amount of that check. The checks are then fed to a check sorter 14. The check sorter 14 provides transit read and amount-encoded checks to a balancing station 16. Transit checks that are not properly amount encoded are passed to a reject key entry station 18 at which the amount is properly encoded. From the reject key entry station 18, the transit checks are passed to the balancing station 16. From the balancing station 16, the transit checks are sent to other banks.

Similarly, on-us read and amount-encoded images (as opposed to the checks themselves) are passed to a balancing station 20, which performs the balancing process with the on-us check images. The on-us images of checks that were not properly amount encoded are provided to a reject key entry station 22. From there, the latter images are passed to the balancing station 20. From the balancing station 20, the on-us check images are sent to a mainframe computer 24, which prepares customer statements to be sent to the customers associated with the respective checks.

There is a legion of prior art patents relating generally to automatic document processing. In addition, much of the recent prior art relates to processing of images of documents. However, as indicated by the following summary of a few representative recently issued patents, the prior art generally discloses expensive "backroom" document processing systems, which, the present inventor believes, fail to adequately address the high cost of check processing.

For example, U.S. Pat. No. 5,204,811, Apr. 20, 1993, titled "Document Processor With Transport Buffer," discloses an image-based system for processing checks and deposit tickets. A deposit ticket and its corresponding checks are transported through a portion of the apparatus where data representing the monetary amounts displayed on the documents is entered into a computer. The checks are held in a buffer area, in a group, until all of the checks in the group corresponding to the deposit ticket have had their amounts entered. When the computer indicates that the total of the entered amounts equals the amount on the deposit ticket, the checks are individually withdrawn from the buffer and delivered to an inscriber which encodes monetary data on the checks. The disclosed system is purportedly superior to similar systems because the need to make corrections to inscribed checks is reduced by inscribing the checks only after balancing.

U.S. Pat. No. 5,187,750, Feb. 16, 1993, "Archival Document Image Processing And Printing System," discloses a highly sophisticated system for handling customer checking accounts. According to the patent, original checks/documents are processed into digital image data and then stored temporarily in magnetic media and transferred to optical long-term archival storage. The system retrieves monthly groups of digital images, and then sorts one-day's worth (i.e., 1/22 of a 22 business-day accumulation) by account number so that statements can be printed each day. Purportedly, massive amounts of data (e.g., for 500,000 to 1,000,000 customer accounts) can be accumulated and stored while the system operates to rapidly retrieve and print sufficient customer statements each day so that each customer will receive a personal monthly statement.

U.S. Pat. No. 5,097,517, Mar. 17, 1992, "Method And Apparatus For Processing Bank Checks, Drafts And Like Financial Documents," discloses a system for reading numeric information on bank checks and like documents. A system purportedly capable of reading unconstrained, constrained, printed, and typed numeric characters, and of locating the division between dollar and cents amounts, analyzes an electronic black and white image of the numeric information on a document. The system purportedly is also capable of reading overlapping touching and not touching characters.

As mentioned above, the prior art fails to adequately address the high cost of check processing. Accordingly, a primary goal of the present invention is to reduce check processing costs.

SUMMARY OF THE INVENTION

The present inventor has discovered that cost savings are achievable by providing a check processing system comprising low cost imaging devices at one or more teller stations. In addition, significant cost savings are achievable in situations where the bank already has a "back room" imaging system so that the images obtained by the low cost imaging devices at the tellers' stations can be electronically merged with the check images and other data being processed by the bank's existing imaging system.

A check image capture system in accordance with the present invention is located at the site of a bank teller for processing on-us and transit checks presented to the teller. One embodiment of the inventive system comprises: image pickup means, located at the site of the teller, for scanning checks presented to the teller and forming image data representing respective images of the checks; classifying means for classifying each of the checks as an on-us check or a transit check; check amount adder means for receiving amount data indicative of the respective amounts associated with the transit checks and computing a total of the amounts; check amount encoder means for encoding each transit check with the amount associated therewith; truncation means for truncating the on-us checks and for transporting the transit checks to the check amount encoder means; amount input means for obtaining amount data indicative of an amount recorded on each of the checks; and a computer, operatively coupled to the image pickup means, check amount adder means, and amount input means. The computer is programmed to store the image data and to identify and store account number data, bank number data, and check number data associated with the checks, and to provide the amount data associated with the transit checks to the check amount adder means. The check amount adder means may be implemented in software and, therefore, be part of the computer. That is, the computer may in fact perform the function of the check amount adder means. If such is the case, there would not need to be a separate check amount adder.

In one presently preferred embodiment, the computer is further programmed to merge the amount data with the image data. This facilitates the preparation of a customer statement depicting an image of the check and amount of the check. In addition, the computer is programmed to merge multiple on-us check images corresponding to on-us checks associated with a common account number, again facilitating the preparation of a customer statement. The computer may also be programmed to receive prerecorded signature data representing a registered signature (or signatures) and to display the signature(s) to the teller, enabling the teller to make a visual comparison of the registered signature(s) and a signature on the check. In addition, the computer may be programmed to provide a correlation parameter indicative of a correlation between the signature on the check and the registered signature.

Another embodiment of the present invention provides a system for processing bank checks, comprising a check image capture system as described above in combination with a prior art "back room" processing system of the type described above.

In addition, a method for processing on-us and transit checks presented to a bank teller in accordance with the present invention comprises the steps of: scanning the checks presented to the teller and forming, at the teller station, image data representing respective images of the checks; classifying each of the checks as an on-us check or a transit check; and truncating the on-us checks and transporting the transit checks to a check amount encoder. Preferred embodiments further comprise the steps of storing the image data and identifying and storing account number data, bank number data, and check number data associated with the checks; obtaining amount data indicative of an amount recorded on each of the checks; computing a total of the amounts; and encoding each transit check with the amount associated therewith.

The present invention may also be applied in processing other types of documents presented to a bank teller. According to this aspect of the invention, a method for processing a document presented to a bank teller at a teller station comprises the steps of scanning the document presented to the teller and forming, at the teller station, image data representing an image of the document; storing the image data and identifying and storing account number data on the document; obtaining amount data indicative of an amount recorded on the document; and forming a combined image comprising the image of the document, account number, and amount. One exemplary application of this aspect of the invention is in processing utility bill payments submitted to a teller.

Preferred embodiments of the present invention capture images of both sides of a check. In addition, the account number on the check is automatically read by an OCR device. When the teller keys the check amount information into the system, the image of the check, the bank number, account number, check number, and check amount data are placed in a file for: (1) balancing the teller's daily work; (2) debiting the amount of the check from the customer's account (i.e., for on-us checks); (3) sending check images and amounts back to the account holder; (4) truncating the check (for on-us checks); and (5) automatically encoding the amount on all non-on-us checks. Regarding the latter operation, the check may be automatically encoded without manual intervention since the account number, bank number, and check number are known.

Optionally, where the bank has installed a signature verification system, the processing provided by the present invention may include: (1) displaying the signature on a check on the teller's screen together with all approved signatures associated with that check (such signatures may be obtained from a file stored on a mainframe); (2) automatically encoding non-on-us checks with a small check feeder/encoder stationed at the teller's location; and (3) automatically verifying the signature on the check, e.g., by displaying a percentage correlation between the signature on the check and the approved signature(s) associated with the account.

Other features and advantages of the invention are described below.

DETAILED DESCRIPTION OF PREFERRED EMBODIMENTS

Figure 1:
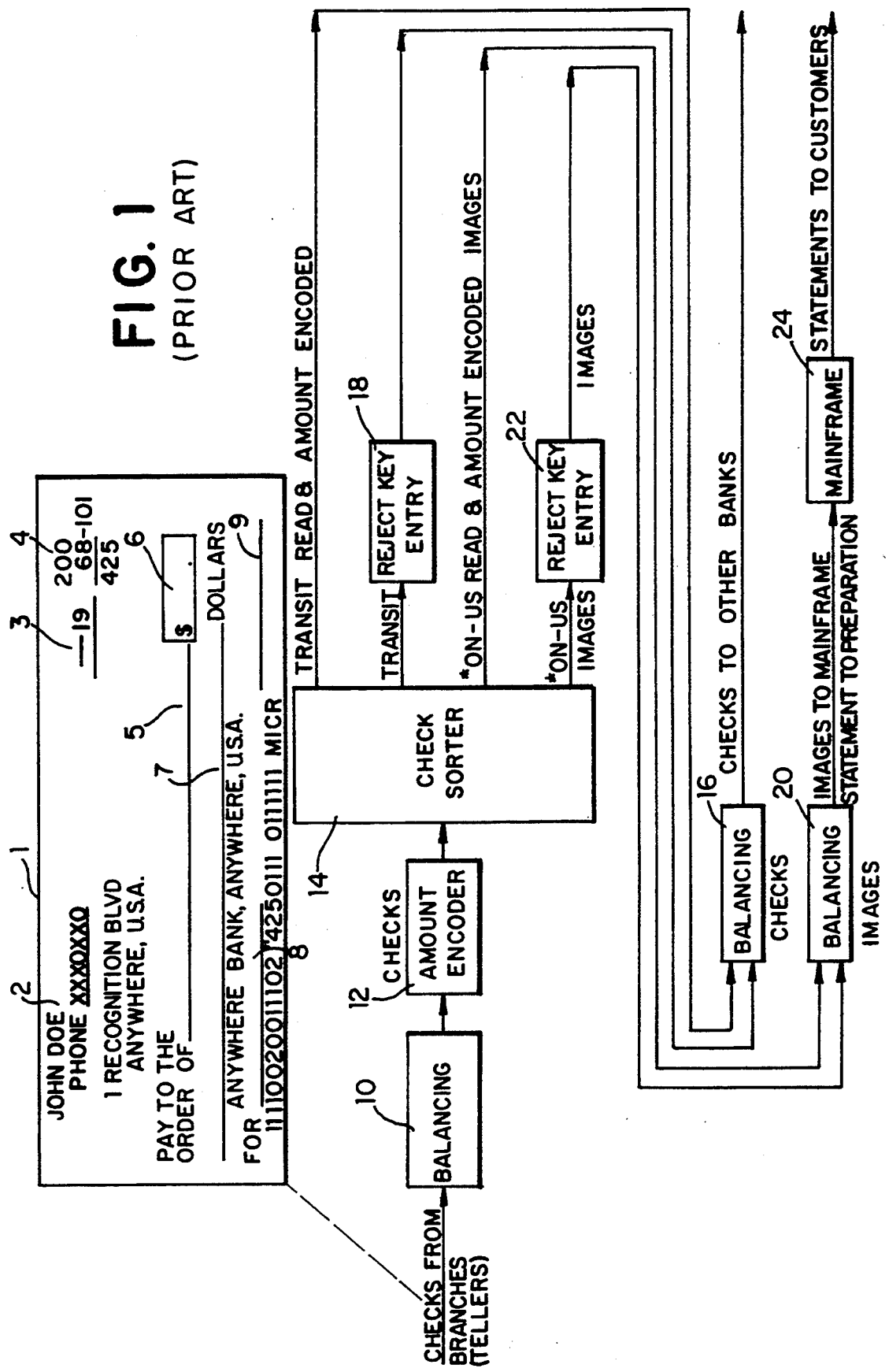
FIG. 1 is a block diagram of a prior art check processing system and includes a depiction of the format of a typical bank check.
Figure 2:
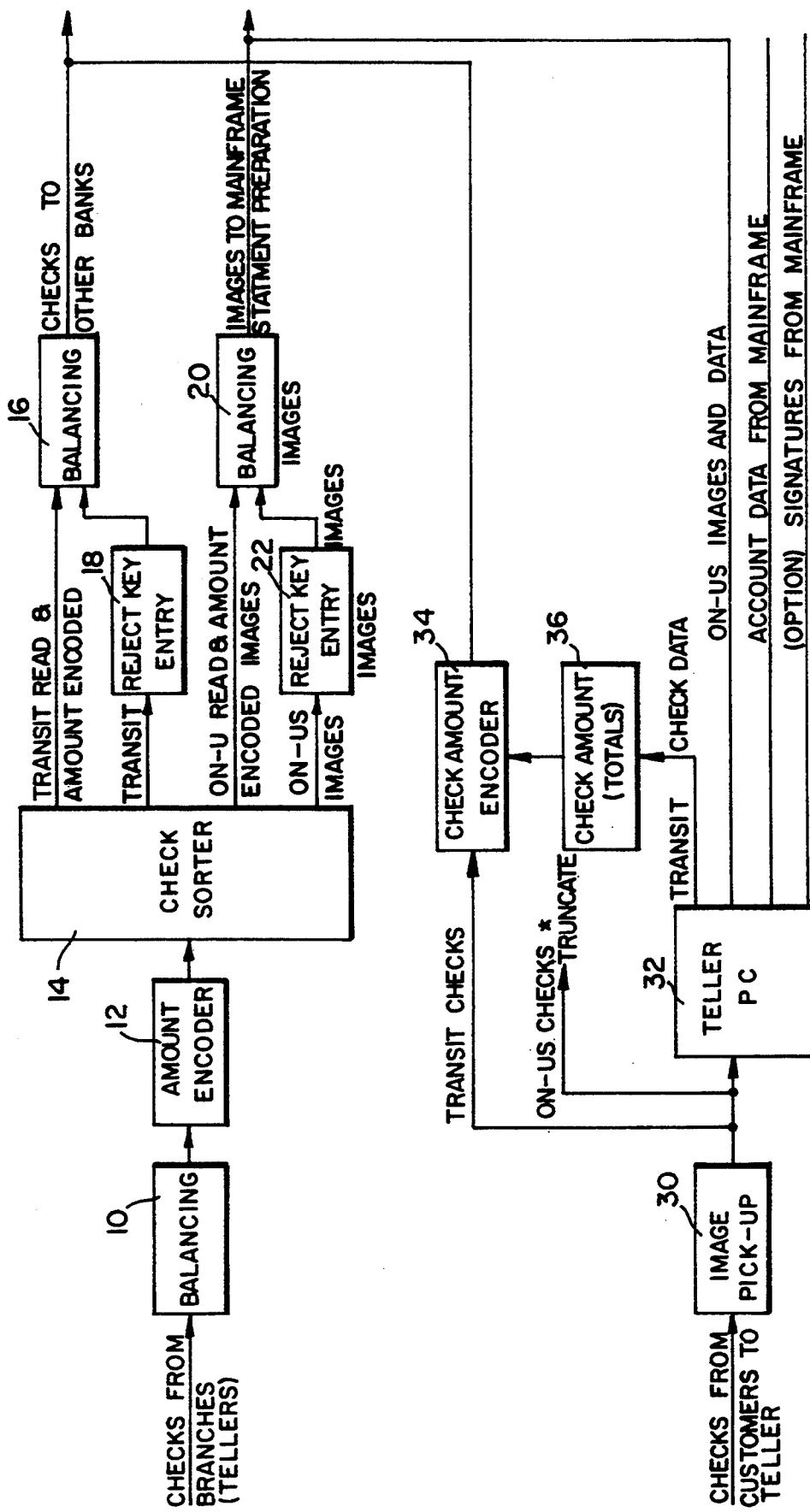
FIG. 2 is a block diagram of a system according to the present invention for processing checks and other documents presented to a bank teller.

The system depicted in FIG. 2 includes the components of the prior art system depicted in FIG. 1, including the balancing station 10, amount encoder 12, sorter 14, balancing stations 16 and 20, key entry stations 18 and 22, and mainframe computer (not shown in FIG. 2). However, the FIG. 2 system also includes a check image capture system located at the site of a bank teller. The check image capture system processes on-us and transit checks as described below to achieve significant cost savings and efficiencies as compared to using the prior art system alone.

One preferred embodiment of the check image capture system includes an image pickup device 30, teller personal computer 32, check amount encoder 34, and check amount adder 36. (As mentioned above, the function of check amount adder may actually be performed by the computer. Therefore, although it is depicted as a separate functional block, the check amount adder may actually be "inside" the computer.) According to the present invention, checks presented to the teller are scanned by the image pickup device 30, which forms image data representing respective images of the checks. Each check is then classified as an on-us check or a transit check (e.g., by examining the bank number on the check). Transit checks are transported to the amount encoder 34 whereas on-us checks are truncated, i.e., are not processed further. The check amount adder 36 receives, from the teller computer 32, amount data for the transit checks and computes the total of the transit check amounts. The check amount encoder encodes each transit check with the amount associated therewith if the check amount total is correct. The check amounts are preferably input to the computer by the teller. However, it is also possible for the amounts to be scanned in by the image pickup device 30. The computer is programmed to store the image data and to identify and store account number data, bank number data, and check number data associated with the checks, and to provide the amount data associated with the transit checks to the check amount adder.

The truncation function may be performed as follows: As soon as the on-us checks are scanned by the image pickup device 30, they are truncated and stored by date for an extended period (e.g., one to ten years). The actual checks are stored so that they may be recovered at a later time. There are two reasons (at least) why an actual check may have to be obtained:

1. An actual check may be needed in the event its stored image were lost.

2. An actual check may be needed in the event of a legal action in which a court refuses to accept the image of the check.

Presently preferred embodiments of the invention include, in the image pickup device 30, a check feeder and two scanners for scanning both sides of the checks. The check feeder may be a simple feeder similar to a feeder for credit card validation in ATMs or dollar bill changers. The resolution of the scanners should be sufficient (e.g., at least 200 bits per inch) to obtain high quality check images and signatures and to read the account number, bank number, and check number by optical character recognition (OCR). The computer may be a PC located at a teller station.

The software employed in preferred embodiments includes: software for performing image amplification and for storing images of both sides of a check; software for performing optical character recognition of the account number, bank number, and check number from the bottom of the check; software for temporarily storing the images of a number of checks; software for merging check amounts (e.g., input by the teller) with the images of the checks so the data can be forwarded to the bank's check processing department; optionally, software for merging account numbers with an existing PC teller automation product; and, optionally, software for merging signatures from the checks with a teller automation product having signature verification capability.

Presently preferred embodiments of the invention offer the following advantages to a bank:

1. The bank may reduce processing costs by truncating all on-us checks and sending only images back to the customer. Such images may be reduced and printed on one or two pages of an account statement.

2. The bank may further reduce processing costs by eliminating encoding of amounts on on-us checks while automatically encoding amounts on non-on-us checks.

3. The bank may further reduce processing costs by eliminating multiple sorts of the same checks to put checks in account number sequence. Balancing check amounts after passing through sorters is often complicated by a failure to read correctly the information in one or more of the various fields of the checks. These rejects are sent to a reject pocket and force an expensive manual balancing step, which may be avoided by employing the present invention.

4. The present invention allows the bank to further reduce costs by assisting the teller in determining whether a check signature is valid. According to this aspect of the invention, the system displays, on a display screen, the signature on the check along with one or more previously approved signatures for that account. This joint display provides a good visual comparison of the signature on the check and a previously verified signature. In addition, an option would be to overlay one signature over the other and provide a color display of non-matching elements of the two signatures. Moreover, in an optional automatic mode, the system could provide the operator an estimation of the correlation between the signature on the check and all the registered signatures for the account. Such a correlation value would assist the operator in making the pay/no-pay decision.

The present invention may also be employed in processing documents other than bank checks to be cashed or deposited. For example, many banks allow their tellers to accept utility bill payments (or other types of payments) by check or cash. In such a case, the utility (or other) bill could be fed through the image pickup device 30, which would store an image of the bill. The customer's account number on the bill would be read (by OCR) and stored, and the teller would key in the amount being paid to the utility. The system would then extract the amount from the teller application and add it to the image of the bill together with the customer's account number. The bank would then be able to send an image statement to the utility summarizing the customer's account numbers and payments. The utility could use such a statement, e.g., for resolving a payment problem. In addition, the images, account data, and the amounts of the utility bills could be sent in an electronic file to the utilities for immediate crediting of the customer accounts. This would eliminate the need for the utilities to feed the checks through another check sorter and perform another balancing.

In addition, the present invention may also be employed in the following applications:

1. Cashing of Social Security Checks

When a Social Security check is cashed, the data, account number, check number, and amount may be placed in a separate file so that a file transfer of the images and a balanced statement could be forwarded to the U.S. Treasury Department. This would eliminate the necessity of encoding the amount on these checks and would reduce sorting costs both at the bank and when the checks are received and debited to the individual Social Security accounts.

2. Intracity Exchange of High Volume Checks Between Large Banks

With check image capture systems in accordance with the present invention installed in most of the larger banks in a city, the transit checks for the large banks (which will have a significant daily volume) that are shown to be encoded could be sent directly to the local bank together with an image file containing the check images and the balanced amount of the checks. These checks could bypass the transit check route. The present process is for the banks to send messengers between large banks in a city with checks and balancing data.

Finally, the scope of protection of the following claims is not limited to the specific preferred embodiments described above. Accordingly, except where they are expressly so limited, the claims are not limited to systems or methods employing any particular image pickup device, computer, check amount encoder, or check amount adder. Moreover, the claims are not limited to systems or methods combining an image pickup device, computer, check amount encoder, and check amount adder with a "back room" check processing system as described above; nor are the claims limited to applications involving check processing, as opposed to processing other types of documents presented to a bank teller.

What is claimed is:

1. A system for processing bank checks, comprising:

a first processing system located remotely from a bank teller, comprising a first balancing station for receiving checks from branches and/or tellers in said bank; an amount encoder receiving said checks from said first balancing station and encoding on each check the amount of that check; a check sorter receiving said checks from said amount encoder; a second balancing station operatively coupled to said sorter, wherein said sorter provides amount encoded transit checks to said second encoder; a first key entry station operatively coupled to said sorter, wherein said sorter provides transit checks that are not properly amount encoded to said first key entry station, and wherein checks from said first key entry station are passed to said second balancing station; a third balancing station operatively coupled to said sorter, wherein on-us read and amount-encoded check images are passed from said sorter to said third balancing station; a second key entry station operatively coupled to said sorter, wherein on-us images of checks not properly amount encoded are provided by said sorter to said second key entry station, and wherein images from said second key entry station are passed to said third balancing station; and a mainframe computer, wherein said on-us check images are sent by said third balancing station to said mainframe computer, said mainframe computer preparing customer statements to be sent to customers associated with the respective checks; and a check image capture system, operatively coupled to said first processing system and located at the site of a bank teller, comprising image pickup means, located at the site of said teller, for scanning checks presented to said teller and forming image data representing respective images of said checks; classifying means, operatively coupled to said image pickup means, for classifying each of said checks as an on-us check or a transit check; check amount adder means for receiving amount data indicative of the respective amounts associated with the transit checks and computing a total of said amounts; check amount encoder means for encoding each transit check with the amount associated therewith; truncation means, operatively coupled to said image pickup means, for truncating said on-us checks and for transporting said transit checks to said check amount encoder means; amount input means for obtaining amount data indicative of an amount recorded on each of said checks; and a computer, operatively coupled to said image pickup means, check amount adder means, and amount input means, said computer being programmed to store said image data and to identify and store account number data, bank number data, and check number data associated with said checks, and to provide the amount data associated with said transit checks to said check amount adder means.

2. A system as recited in claim 1, wherein said computer is further programmed to merge said amount data with said image data, whereby the preparation of a customer statement depicting an image of said check and amount of said check is enabled.

3. A system as recited in claim 2, wherein said computer is further programmed to merge multiple on-us check images corresponding to on-us checks associated with a common account number.

4. A system as recited in claim 1, wherein said computer is further programmed to receive prerecorded signature data representing a registered signature(s) and to display said signature(s) to the teller, whereby the teller is enabled to make a visual comparison of said registered signature(s) and a signature on said check.

5. A system as recited in claim 4, wherein said computer is further programmed to provide a correlation parameter indicative of a correlation between the signature on the check and the registered signature.

6. A system as recited in claim 5, wherein said computer is further programmed to merge said amount data with said image data, whereby the preparation of a customer statement depicting an image of said check and amount of said check is enabled; and wherein said computer is further programmed to merge multiple on-us check images corresponding to on-us checks associated with a common account number.

* * * * *